Jan. 13, 1925.
E. L. FICKETT
1,522,674
JOURNAL TURNING AND QUARTERING MACHINE
Filed May 10, 1922     3 Sheets-Sheet 1
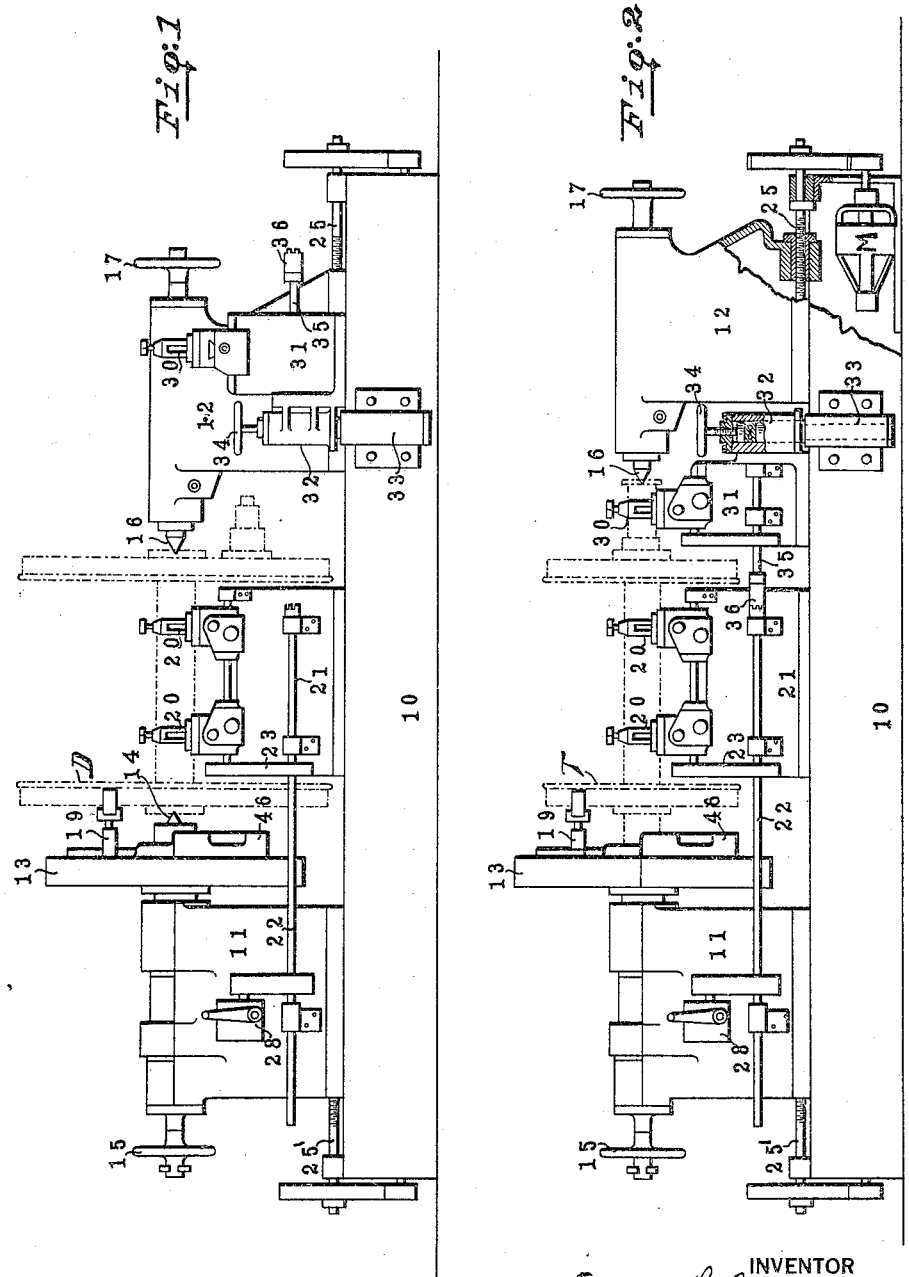
INVENTOR
Ernest L. Fickett
BY
Duell, Warfield & Duell
ATTORNEY

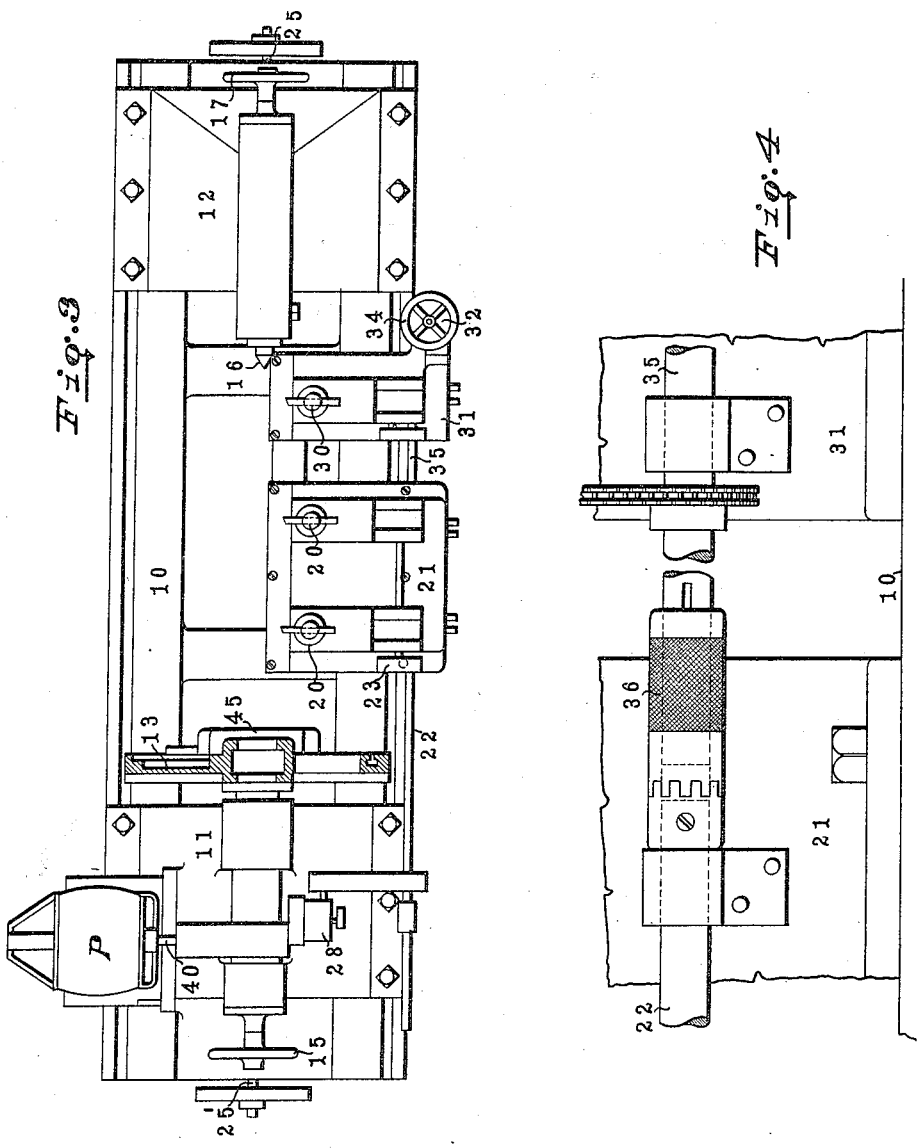

Jan. 13, 1925.
E. L. FICKETT
1,522,674
JOURNAL TURNING AND QUARTERING MACHINE
Filed May 10, 1922   3 Sheets-Sheet 3
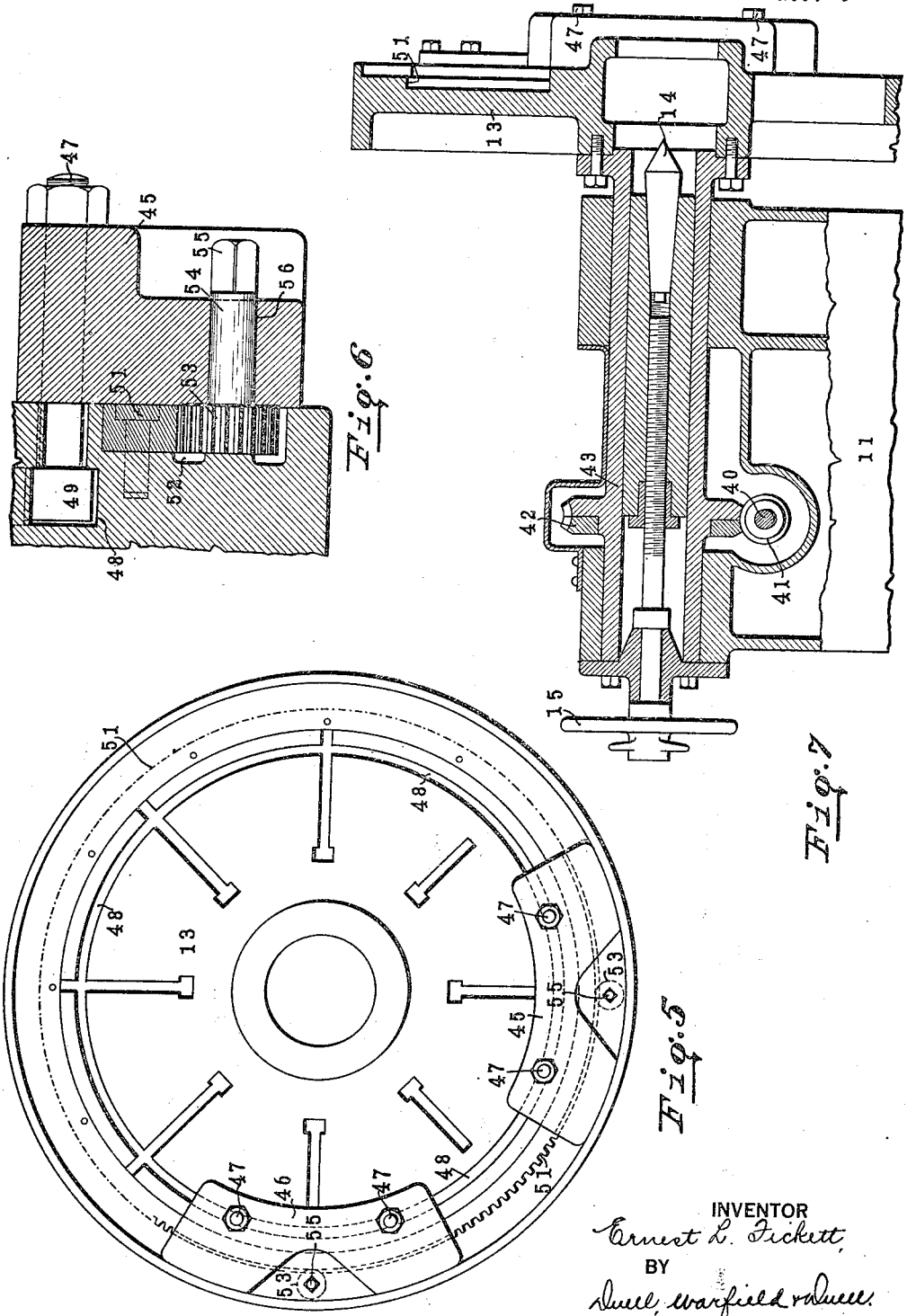
INVENTOR
Ernest L. Fickett,
BY
Duell, Warfield & Duell.
ATTORNEY Patented Jan. 13, 1925.

1,522,674

UNITED STATES PATENT OFFICE.

ERNEST L. FICKETT, OF FITCHBURG, MASSACHUSETTS, ASSIGNOR TO MANNING, MAXWELL & MOORE, INC., OF NEW YORK, N. Y., A CORPORATION OF NEW JERSEY.

JOURNAL TURNING AND QUARTERING MACHINE.

Application filed May 10, 1922. Serial No. 559,757.

*To all whom it may concern:*

Be it known that I, ERNEST L. FICKETT, a citizen of the United States, residing at Fitchburg, in the county of Worcester and State of Massachusetts, have invented certain new and useful Improvements in Journal Turning and Quartering Machines, of which the following is a full, clear, and exact description, such as will enable others skilled in the art to which it appertains to make and use the same.

This invention relates to machine tools, and more particularly to lathe type machine tools adapted for the machining of locomotive driving wheel sets and trailer sets.

This invention has for its general object an improved construction and arrangement of parts which is durable, efficient, and readily manufactured.

A more specific object is the provision of an arrangement in lathe type machine tools which is adapted equally well to the machining of both locomotive driving wheel sets and of trailer sets.

Another object is the provision of improved means for dynamically balancing driving wheel sets while being machined in such type of machine tool.

Another object is to provide the face plates of lathes transmitting the driving thrust to driving wheel sets while being machined with improved devices adapted to counterbalance, in any desired degree, the unbalanced torque upon the driving wheel sets produced by gravity acting on the unbalanced component of its own balancing weights.

Another object is to provide a face plate for lathes adapted for machining driving wheel sets with a set of counterbalancing weights adapted to be moved individually to desired points on the circumference of the face plate, and even to diametrically opposite points so that they will not have to be removed when trailer sets are to be turned.

Another object is to provide an improved arrangement adapted for machining both the inside journals of driving wheel sets and the outside journals of trailer sets.

Another object is to provide lathes of this character with an improved arrangement of the tool rest and carriage which supports the tool adapted to machine the journals of trailer sets.

Still another object is to provide this character of lathe with a pivotal arrangement for swinging the tool rest and carriage, which is designed to machine the outside journals of trailer sets, into and out of operative position.

Other objects of this invention will in part be hereinafter specifically pointed out and in part obvious from the arrangements and constructions here set forth.

The invention accordingly consists in the features of construction, combinations of elements and arrangement of parts which will be exemplified in the construction hereinafter set forth, and the scope of their application will appear in the appended claims.

For a more complete understanding of the nature and advantages of this invention reference should be had to the following detailed description, which describes the best illustrative embodiments of this invention at present known to me, taken in connection with the accompanying drawing in which:

Figure 1 shows a front elevation of a lathe type machine tool constructed in accordance with this invention, and arranged for machining a driving wheel set;

Fig. 2 shows a front elevation of the lathe shown in Fig. 1, a part being broken away, when adapted for machining a trailer set;

Fig. 3 is a horizontal plan view of the lathe shown in Figs. 1 and 2;

Fig. 4 shows a detail of the shaft coupling for transmitting driving force to the tool supporting carriage which is adapted to be swung into and out of position;

Fig. 5 is a front elevation of the face plate for a lathe provided with counter-balancing weights in accordance with this invention;

Fig. 6 shows a detail of the face plate construction; and

Fig. 7 shows, mainly in vertical section, the driving means for the face plate.

Referring now to the drawings, and to Figs. 1 and 2 in particular, 10 denotes the bed of the lathe which has a head-stock 11 at the left hand end and a tail-stock 12 at the right hand end. Journaled in the head-stock 11 is a face plate 13 which has a live center 14 adapted to be reciprocated forward and backward therein by the hand wheel 15 in order to be moved outward into, or retracted from operative position. The tail-stock 12 has the dead center 16 operated by the hand wheel 17 for moving it also into and out of operative position. As shown in Fig. 1 the centers 14 and 16 are in operative position supporting a driving-wheel set D in order to be machined. This driving-wheel set is driven while being machined by the projection 19 secured on the face plate.

The tools or other implements for accomplishing the machine operation on the inside journals of the driving-wheel set D are supported in place by the tool-rests 20, which in turn are supported by the carriage 21 disposed on the ways of the bed 10. Power for operating the tool feeds of the tool-rests 20 is transmitted through the shafting 22, journaled on the front of the machine and provided with suitable gearing 23, (preferably enclosed) for transmitting motion from the shafting 22 to the feeding mechanism of the tool-rests 20.

When the lathe is machining the journals of a trailer set as indicated at T in Fig. 2 the tail-stock 12 is sufficiently withdrawn that the projecting ends of the outside journals of the set T may be put in place. Screws are preferably provided, as indicated at 25, which are operated by power means, as the electric motor shown at M within the bed of the lathe, for moving the tail-stock 12. A similar screw is shown at 25' for moving the head-stock 11. The live center in the head-stock 11, as here shown, is sufficiently retracted so that the left hand journal engages therewith within the central opening of the face plate 13. The trailer set T is adapted to be driven while being machined by the projection 19 disposed on the face-plate 13 in substantially the same manner as when machining the driving-wheel set D.

As the tool-rests 20 are not in a position adapted for turning the outside journals of the trailer set T an additional tool-rest 30 is provided supported on a separate carriage 31. The carriage 31 is pivoted by means of the support at 32 to the vertical mast 33, the latter being secured to the outside of the bed 10. The support 32 has a threaded vertical passage through the top. A hand wheel 34, preferably is provided on top of a screw 60 in said thread for raising the carriage 31 so that it may be swung in a horizontal plane about the mast 33. The screw 60 has a head on the bottom carried on the top of the mast 33 resting on a set of bearing balls thereon. The carriage 31 is also provided with shafting 35 adapted to be mechanically coupled by a separable coupling shown at 36 with the end of the shafting 22 when it is swung to the position shown in Fig. 2 which is the operative position when machining the journals of the trailer set T. The shafting 35 on the carriage 31 is adapted when coupled to a source of power at 36 to drive the tool-feed of the tool-rest 30.

In Fig. 1 the carriage 31 is indicated as swung back out of operative position so that the tail-stock 12 may be moved closer when supporting the driving-wheel set D. The shafting 35 having been uncoupled at 36 from the shafting 22 previous to the swinging of the carriage out into the retracted position here indicated.

In Fig. 3 the lathe is shown as provided on its rear side with an electric motor P, for supplying the driving power for the machining operations. The motor P drives a worm shaft 40 provided with a worm 41 within the frame of the head-stock 11 as shown in Fig. 7, which worm transmits motion to the worm gear 42 on the revolving journal 43 on which the face plate 13 is secured. Power for operating the tool feeds is also transmitted to the shafting 22 from the motor P, preferably though through suitable gearing, as indicated at 28, which receives the power from the motor P through the front end of the worm shaft 40.

In order that the face plate shall be in dynamic balance when either a driving-wheel set or a trailer set is being machined, it is provided with counter-balancing devices, preferably two in number, as shown at 45 and 46 in Fig. 5. These counter-balancing devices comprise arc-shaped weights which have means for slidably anchoring them to the face plate 13, comprising bolt-like guiding members 47 projecting into the circumferentially-shaped guideway 48 formed in the face of the face plate, a predetermined radial distance from the outside edge of the face plate. These boltlike guide members 47 are preferably provided with enlarged inner ends as indicated at 49 in Fig. 6, in order to prevent their being pulled out of the guideway 48; thereby providing means for securing the counter-balancing devices 45 and 46 in place.

In order that these counter-balancing devices may be easily adjusted to different positions about the circumference of the face plate, an annular gear 51 is set in, flush with the face of the face plate, and secured in a suitably formed groove 52 which is concentric with, but preferably outside of, the guideway 48. This annular gear 51 serves as a rack with which pinion 53, secured on the stud or shaft 54, engage; the annular groove 52 being made of sufficient width to accommodate the pinion 53 in its travel on the gear 52. The stud 54 is provided with a squared end 55, which is adapted to have applied thereto a wrench or other suitable tool for turning it. The stud is held within a bore 56, formed in the counter-balancing device, in order to provide means for moving the counter-balancing device any desired distance by means of suitable tool applied to its squared end 55. Each counter-balancing device is also provided with bolts 47, having an enlarged square head 49, moving in slot 48. A nut applied to bolt 47 draws counterbalancing device 45 tightly to face plate 13 and provides a means of retaining counterbalancing devices in any predetermined position.

In operation when a driving-wheel set is between the lathe centers, as indicated in Fig. 1, it is necessary to balance dynamically the rotating system which is revolved during the machining operation. Now all driving-wheel sets for steam locomotives, in accordance with the present practice, are provided with balancing weights, each driving-wheel of a set having its balancing weights disposed diametrically opposite its crank pin and so proportioned as to counter-balance the weight of the crank pin and the portion of the connecting rod or rods thereon so as to be substantially balanced when revolving in a locomotive; in consequence the set when alone in a lathe to be machined (the connecting rods having been removed), has an unbalanced component remaining, which compounds geometrically with a similar unbalanced component of the other driver on the driving axle, by reason of the fact that the two drivers have their crank pins and consequently their balancing weights displaced from each other by substantially 90° about the axis of the driving axle. The resultant unbalanced component of the set is acted upon by gravity to produce a torque unbalancing the system rotated in the lathe while being machined, unless suitable counter-balancing means are provided. It is seen that the counter-balancing devices 45 and 46 may be moved by means of a suitable tool to various individual positions about the circumference of the face plate 13. As a result these counter-balancing devices may be so adjusted as to counter-balance any desired component, from zero magnitude when the counter-balancing devices are disposed in diametrically opposite positions, to a magnitude resulting from their combined mass when moved to abutting positions at the end of a radius of the face plate. Accordingly by suitably adjusting the counter-balancing devices 45 and 46, angularly displaced positions may be found therefor such as to bring the rotating system into dynamic balance while machining any driving wheel set.

When machining a trailer set the counter-balancing devices 45 and 46 are moved to diametrically opposite positions on the face plate 13, since trailer sets are not provided with balancing weights, etc., which must be counter-balanced while being machined.

Before the trailer set can be put in place to be machined the tailstock 12 must be drawn back from the position shown in Fig. 1 to the position shown in Fig. 2. For this purpose the electric motor shown at M is energized and the screw 25 driven until the tail-stock is drawn back sufficiently toward the end of the bed of the lathe. The hand wheel 15 on the head-stock would likewise be manipulated to retract the live center 14 to a position within the opening of the face plate 13 suitable for admitting the projecting end of the outside journal of the trailer set T. When this trailer set has been secured in position and the projection 19 is suitably adjusted on the face plate so as to transmit driving force thereto, the carriage 31 may then be swung about its pivotal support on mast 33 into operative position upon the bed 10, as indicated in Fig. 2. The coupling 36 in then manipulated so as mechanically to couple the shaft 35 with the shaft 22. In the form shown in the drawing, as particularly illustrated in Fig. 4, this coupling comprises a sleeve which slides on the shaft 35 and has toothed engagement with a coresponding member of the end of shaft 22, which when in place forms a mechanically rigid connection for transmitting motion of rotation to the shaft 35 which in turn transmits driving force for the tool feed of the tool rest 30 on the carriage 31.

As many changes could be made in the details of the invention as exemplified in the foregoing description, and many apparently widely different embodiments could be made without departing from the scope thereof, it is intended that all matter contained in the description or shown is the accompanying drawings shall be interpreted as illustrative and not in a limiting sense.

It is also to be understood that the language used in the following claims is intended to cover all of the generic and specific features of the invention herein described and all statement of the scope of the invention, which, as a matter of language, might be said to fall therebetween.

I claim:

1. In a machine tool adapted for the machining of locomotive driving-wheel sets and trailer sets, the combination with a head stock and revolving face plate, of a tail stock, means for setting the tail stock in two different positions for adapting it interchangeably to the machining of either a driving wheel set or a trailer set, a tool rest in position for holding a tool to turn the axle of a driving wheel set, a tool rest mounted near the tail stock and movable into and out of position to hold a tool for turning the outside journal of a trailer set and means on the machine for supporting the last named tool rest in its operating and idle positions.

2. In a machine tool adapted for the machining of locomotive driving-wheel sets, the combination with a revolving face plate, balancing means thereon adapted to be adjusted to varying positions, and a tool rest, of means whereby the balancing means can be neutralized without removing it when machining a trailer set.

3. In a machine tool adapted for the machining of locomotive driving wheel sets, the combination with a revolving face plate, of means adapted to balance dynamically a driving wheel set while being machined, and capable of being moved on the face plate to positions in which its balancing effect will be neutralized to adapt the tool to machine trailer sets.

4. In a machine tool adapted for the machining of locomotive driving wheel sets and trailer sets, the combination with a revolving face plate, of two weights adjustable thereon to counterbalance an unbalanced gravity component varying with the sets machined and capable of adjustment without removing them from the face plate to diametrically opposite points thereon for machining trailer sets.

5. In a machine tool adapted for the machining of locomotive driving-wheel sets and trailer sets, the combination with a revolving face plate, of a plurality of counterbalancing devices adjustable to varying points about the circumference of said face plate.

6. In a machine tool adapted for the machining of locomotive driving-wheel sets and trailer sets, the combination with a revolving face plate, of a plurality of counterbalancing devices thereon; said face plate being provided with a circumferential guideway in which said devices may be individually moved to varying positions on the circumference.

7. In a lathe type machine tool, the combination with a bed having a head-stock, of a rotatable face plate journaled in said headstock, and a plurality of adjustable counterbalance devices independently adjustable about the circumference of said face plate.

8. In a lathe type machine tool, the combination with a bed having a head-stock, of a rotatable face plate journaled in said headstock, said face plate having a circumferential guideway formed therein, and a plurality of counter-balance devices adapted to move in said guideway.

9. In a lathe type machine tool, the combination with a bed having a head-stock, of a rotatable face plate journaled in said headstock, said face plate having a circumferential guideway formed therein, and a pair of arc-shaped weights having anchoring portions adapted to slide in said guideway.

10. In a lathe type machine tool, the combination with a bed having a head stock, of a rotatable face plate journaled in said head stock, provided with a guide-way having a groove, a gear set in said groove flush with the face of said face plate, and a pair of weights each having anchoring portions adapted to slide in said guide way and a pinion on its under side fitting into said groove and engaging with said gear, said pinion on each weight having an actuating stud projecting through the weight and adapted to be engaged by a tool for turning it.

11. In a lathe type machine tool, the combination with a bed having a head stock, of a rotatable face plate journaled in said head stock, said face plate having a guide way therein, a gear on said face plate, and a plurality of counter-balance devices adapted to move in said guide way and provided with pinions engaging with said gear.

12. In a lathe type machine tool, the combination with a bed having a head-stock, of a rotatable face plate journaled in said headstock, said face plate having a circumferential guideway formed therein, an annular gear on said face plate, and a plurality of counter-balance devices adapted to move in said guideway and provided with pinions engaging with said gear.

13. In a lathe type machine tool, the combination with a bed having a head-stock, of a rotatable face plate journaled in said headstock, said face plate having a circumferential guideway formed therein, an annular gear set in said face plate flush with the surface thereof, and a plurality of counter-balance devices each having an anchoring portion adapted to move in said guideway and a pinion engaging with said gear.

14. In a lathe type machine tool, the combination with a bed having a head-stock, of a rotatable face plate journaled in said headstock, said face plate having a circumferential guideway formed therein, an annular gear set in the face of said face plate flush with the surface of the face plate and having a groove accommodating the teeth of said gear arranged concentric with said guideway, and a pair of arc-shaped weights each having anchoring portions in said guideway and a pinion on its underside arranged to engage with said gear in said groove.

15. In a lathe type machine tool, the combination with a bed having a head-stock, of a rotatable face plate journaled in said headstock, having a retractable live center and provided both with a guide-way formed a predetermined distance from its circumference and with an annular groove concentric with the guideway, an annular gear set in said groove flush with the face of said face plate, and a pair of arc-shaped weights each having anchoring portions adapted to slide in said guideway and a pinion on its underside fitting into said groove and engaging with said gear; said pinion on each weight having an actuating stud projecting through the weight and adapted to be engaged by a tool for turning it.

16. In a lathe type machine tool, the combination with a bed having a head-stock, of a rotatable element journaled in said head-stock, a carriage adapted to support a tool rest, and a pivotal supporting means on said bed for said carriage.

17. In a lathe type machine tool, the combination with a bed having a head-stock, of a rotatable element journaled in said head-stock, a carriage adapted to support a tool rest, and means on said bed for pivotally supporting said carriage so as to be swung in a substantially horizontal plane into and out of operative position upon the bed.

18. In a lathe type machine tool, the combination with a bed having a head-stock, of a rotatable element journaled in said head-stock, a carriage adapted to support a tool rest, a vertical mast rigidly secured to said bed, and a pivotal support swinging thereon for said carriage.

19. In a lathe type machine tool, the combination with a bed having a head-stock, of a rotatable element journaled in said head-stock, a carriage adapted to support a tool rest, a vertical mast rigidly secured on the exterior of said bed, and a pivoted support thereon secured to said carriage.

20. In a lathe type machine tool, the combination with a bed having a head-stock, of a rotatable element journaled in said head-stock, a carriage adapted to support a tool rest, a vertical mast rigidly secured thereto on the exterior of said bed, and a pivoted support having a hand wheel for manipulating the same about said mast and carrying said carriage.

21. In a lathe type machine tool, the combination with a bed having a head-stock, of a rotatable element journaled in said head-stock, a carriage adapted to support a tool rest, a power driven tool feed for said tool rest, means for pivotally supporting said carriage to swing in substantially a horizontal plane, and means for mechanically coupling said tool drive to a source of power when said carriage is swung to operative position.

22. In a lathe type machine tool, the combination with a bed having a head-stock, of a rotatable element journaled in said head-stock, a carriage adapted to support a tool rest, a power driven tool feed for said tool rest, means for pivotally supporting said carriage, and means comprising a toothed sleeve for mechanically coupling a shaft of the tool drive to a corresponding toothed sleeve on a power driven shaft when said carriage is swung to operative position.

23. In a lathe type machine tool, the combination with a bed having a head-stock, of a rotatable element journaled in said head-stock, a carriage adapted to support a tool rest, a power driven tool feed for said tool rest, means for pivotally supporting said carriage to swing in substantially a horizontal plane, and means adapted mechanically to couple and uncouple the tool drive of said tool rest with a source of power comprising a shaft on said carriage arranged to transmit power to said tool drive and provided with a coupling, and a co-operating shaft and coupling driven by power supported in fixed relation on said machine bed.

24. In a lathe type machine tool, the combination with a bed having a head-stock, of a rotatable element journaled in said head-stock, a carriage adapted to support a tool rest, a tool feed for said tool rest, means for pivotally supporting said carriage, and means adapted mechanically to couple and uncouple the tool feed drive on said tool rest with a source of power comprising a shaft rotatably mounted on said carriage arranged to transmit power to said tool drive and provided with a toothed sleeve slidable thereon, and a co-operating shaft power driven and rotatably supported in fixed relation with the bed of the machine and having a toothed member adapted to be engaged by said toothed sleeve when slid thereagainst after the carriage has been swung to operative position.

25. In a lathe type machine tool, the combination with a bed having a head-stock provided with a rotatable face plate, of adjustable means on said face plate adapted to counter-balance an unbalanced gravity component in the article being machined, and a carriage on said bed having a tool rest and adapted to swing in a substantially horizontal plane out of and into operative position.

26. In a lathe type machine tool, the combination with a bed having a head-stock provided with a rotatable face plate, of adjustable counter-balancing devices individually adjustable to different positions on said face plate, a carriage on said bed having a tool rest, and a pivotal support for said carriage arranged to permit the swing of said carriage in a substantially horizontal plane into and out of operative position upon the bed of the machine.

27. In a lathe type machine tool, the combination with a bed having a head-stock provided with a rotatable face plate, of arc-shaped weights adapted to be individually adjusted to different positions about the circumference of said face plate, a carriage on said bed having a tool rest, a mast secured in vertical position on said bed, and a support for said carriage pivotally secured on said mast whereby said carriage may be swung in substantially a horizontal plane into and out of operative position upon said bed.

28. In a lathe type machine tool, the combination with a bed having a head-stock provided with a rotatable face plate, said face plate being provided with a circumferential guideway and an annular groove concentric therewith, of a pair of arc-shaped weights movably anchored in said guideway, a gear in said groove set in flush with the face of said face plate, a pinion on each of said weights meshing with said gear and adapted to be turned from the outer side of said weights, a carriage on said bed having a tool-rest, a mast secured in vertical position on said bed, and a support for said carriage pivotally secured on said mast.

29. In a lathe type machine tool, the combination with a bed having a head-stock provided with a rotatable face plate, said face plate being provided with a circumferential guideway and an annular groove concentric therewith, of a pair of arc-shaped weights movably anchored in said guideway, a gear in said groove set in flush with the face of said face plate, a pinion on each of said weights meshing with said gear and adapted to be turned from the outer side of said weights, a carriage on said bed having a tool rest, a tool feed for said rest, shafting having a coupling mounted on said carriage and adapted to drive said tool feed when coupled to a source of power, a mast secured in a vertical position exteriorly on said bed, and a support for said carriage pivotally secured on said mast.

In testimony whereof I affix my signature in the presence of two witnesses.

ERNEST L. FICKETT.

Witnesses:
JOHN J. CONROY,
HILMA M. LAHTI.